United States Patent [19]
Grisé

[11] Patent Number: 6,033,570
[45] Date of Patent: Mar. 7, 2000

[54] WASTE TREATMENT

[76] Inventor: Michel Grisé, 2101 Nobel, Local E, Ste-Julie, Québec, Canada, J2J 1E2

[21] Appl. No.: 09/057,986

[22] Filed: Apr. 10, 1998

[51] Int. Cl.$^7$ ..................................................... C02F 3/04
[52] U.S. Cl. ......................... 210/609; 210/617; 210/631; 210/770; 210/806
[58] Field of Search .................. 210/603, 609, 210/617, 631, 768, 770, 806

[56] References Cited

U.S. PATENT DOCUMENTS

| | | | |
|---|---|---|---|
| 2,642,394 | 6/1953 | Paulette et al. | 210/617 |
| 4,018,899 | 4/1977 | Seckler et al. | 210/806 |
| 4,198,211 | 4/1980 | Shattock | 210/603 |
| 4,298,621 | 11/1981 | Samis et al. | 210/603 |
| 4,338,337 | 7/1982 | Frankl | 210/769 |
| 4,380,496 | 4/1983 | Maffet | 210/609 |
| 4,391,623 | 7/1983 | Knepper | 210/609 |
| 4,872,998 | 10/1989 | Dausman et al. | 210/770 |
| 5,009,795 | 4/1991 | Eichler | 210/770 |
| 5,269,939 | 12/1993 | Laurent et al. | 210/770 |
| 5,545,325 | 8/1996 | Hsu et al. | 210/605 |
| 5,593,590 | 1/1997 | Steyskal | 210/609 |
| 5,698,110 | 12/1997 | Wyatt | 210/770 |

*Primary Examiner*—Christopher Upton
*Attorney, Agent, or Firm*—Eric Fincham

[57] ABSTRACT

A process for the treatment of liquid hog manure which comprises adding a cellulosic material to the liquid hog manure, mixing the cellulosic material and liquid hog manure, separating said mixture to leave a solids portion and a liquid portion, drying said solids portion, and further treating said liquid portion. The method removes solids from the liquid hog manure and the solids may then be used for a fuel value while the liquid portion may be used as a manure or for other purposes.

7 Claims, 1 Drawing Sheet

WASTE TREATMENT

BACKGROUND OF THE INVENTION

The present invention relates to waste treatment and more particularly, relates to a method of treatment of liquid hog manure.

The problem of the disposal of liquid hog manure is a worldwide one and there have been various proposals made to address the problem. Liquid hog manure is considered to be a severe environmental pollutant; one of the major problems of the manure is the amount of nitrogen. Although nitrogen is an essential nutrient for plant growth and other organisms, an excess of nitrogen in used water is known to cause problems. Thus, certain microorganisms utilize the nitrogen as a food source and consume oxygen to the detriment of other life in the water.

The problem is sufficiently severe that many locals have very strict regulations regarding the raising of hogs. The smell associated with the liquid hog manure is objectionable to most people. Accordingly, even though some farmers would like to increase their quota, regulations prohibit the same.

One of the problems with the treatment of liquid hog manure is the amount of pollutants therein—$DBO_5$ totaling about 35 mg/liters DCO of approximately 80,000 mg/liters high salt contents as well as mineral contents, ammonium compounds, etc.

A problem which also exists in the pulp and paper/forest industry is the amount of residue generated during logging and pulp and paper operations. In one report pertaining to waste in the Province of Quebec, Canada, the report states that the pulp industry daily generates 3,700 metric tonnes of dry residue. The same report shows that the pulp and paper firms recovered only 56.2% of the energy value of the wood while 41.1% of residues were typically disposed by burial.

While again various proposals have been advanced for the productive use of waste for residue generated by the pulp and paper/forestry industries, such proposals have generally involved a significant expense compared to any potential revenue generation.

It would therefore be desirable to provide a process which would utilize waste inputs from different sources and while at the same time generating value added product.

SUMMARY OF THE INVENTION

It is an object of the present invention to provide a method for the treatment of liquid hog manure and which method recovers at least a portion of the solid contents of liquid hog manure.

It is a further object of the present invention to provide a value added method for the treatment of waste material and particularly liquid hog manure and cellulosic waste.

According to one aspect of the present invention, a method comprising the steps of forming a mixture comprised of liquid hog manure and a cellulostic material, passing the mixture through a separation step to provide a liquid portion and a solid portion, passing the liquid portion through at least one aerobic treatment and drying the solids portion.

In a further aspect of the present invention there is provided a method for the treatment of liquid hog manure comprising the steps of adding a cellulostic material to the liquid hog manure, mixing the liquid hog manure and the cellulosic material, removing a liquid portion from the mixture to leave a solids portion, drying the solids portion, and further treating the liquid portion following removal of the solids portion.

In greater detail, the method of the present invention both overcomes a problem with the disposal of liquid hog manure and also provides a value added step for the use of cellulosic waste material.

An advantage of the present invention is that the process can be carried out at the source where the liquid hog manure is generated—i.e. the farm. The process does not require equipment which is exorbitantly expensive. Naturally, as an alternative it will be understood that the liquid hog manure could be transported to a central location for processing.

Many known cellulosic materials may be utilized in the practice of the present invention. It is naturally preferable that waste cellulosic material be employed although certain low cost virgin materials could be considered. Such material would include, for example, wood shavings, bark, and other such dry residues from the pulping process. Waste generated from de-inking of papers could also be employed. As mentioned even virgin cellulosic material such as may be grown on the farm or otherwise available could be employed if economically feasible.

In the first step, the cellulosic material and the liquid hog manure are mixed together under suitable conditions to form a relatively homogeneous mixture. The cellulosic material is preferably in a sufficiently divided condition and the mixing may be accomplished by any suitable well known means in a suitable container.

In a typical farm environment, the liquid hog manure would be stored in a suitable septic tank or container while the cellulosic material may be available locally or be provided from a storage container.

Subsequently, the mixture of liquid hog manure and cellulosic material is subjected to a separation or filtration step wherein one then has a liquid portion separated from a solids portion. Again, many known apparatuses can be utilized. In one particular preferred embodiment, a screw press could be employed to separate the liquid portion from the solids portion while at the same time the press would compact the solids portion. In doing so, much of the original solids content of the liquid hog manure will be retained by the cellulosic fibers.

The liquid separated from the mixture may then be subjected to one or more of a number of different treatment steps. In one embodiment, the liquid may first be subjected to a further filtration/separation step to ensure the removal of substantially all solids. To this end, one may use a cyclonic separator to achieve such a further separation with any removed solids being incorporated with the original solids portion removed from the mixture.

Subsequently, the liquid portion would be subjected to further treatments. In one particular preferred embodiment, the liquid portion would then be processed through a so-called "bio-tower" wherein the waste water is subjected to an aerobic treatment. Such structures are also known as trickle cells. In the arrangement, the water is allowed to pass from the top of the tower over a treatment media which contains a relatively large surface area. The media develops a film of bacteria thereon which act to consume nutrients in the waste water.

The waste liquid may be treated to a series of such operations—the trickle cells may be arranged either in series or in parallel—such treatment arrangement are well known in the art.

Subsequently, the liquid portion would preferably be subjected to at least one further step. In this step, one option would be to employ what is known as a tubular biological reactor which essentially consists of a tube of a small diameter and a relatively large length. It is rolled on itself in the horizontal plane so as to create an undulating slope. The waste water is circulated and may be subjected to an aeration step.

In addition to or supplemental to the above, known rotating biological contactors could be employed wherein members rotate into and out of contact with the liquid portion with a container.

Subsequently, the liquid portion may be used in a traditional manner of spreading the liquid on the fields as a manure or alternatively could even be subjected to further treatment if so desired. Such further treatment would depend upon the output of the waste water and contents thereof Various polishing operations, or denitrification and the like could be utilized.

The solids content removed during the process of the present invention would then undergo a drying step following which it can be used in any suitable operation to recover the heat value from the solids. The solids could, for example, be briquetted or granulated as desired for use as a fuel.

BRIEF DESCRIPTION OF THE DRAWINGS

Having thus generally described the invention, reference will be made to the accompanying drawing, in which.

Figure 1:
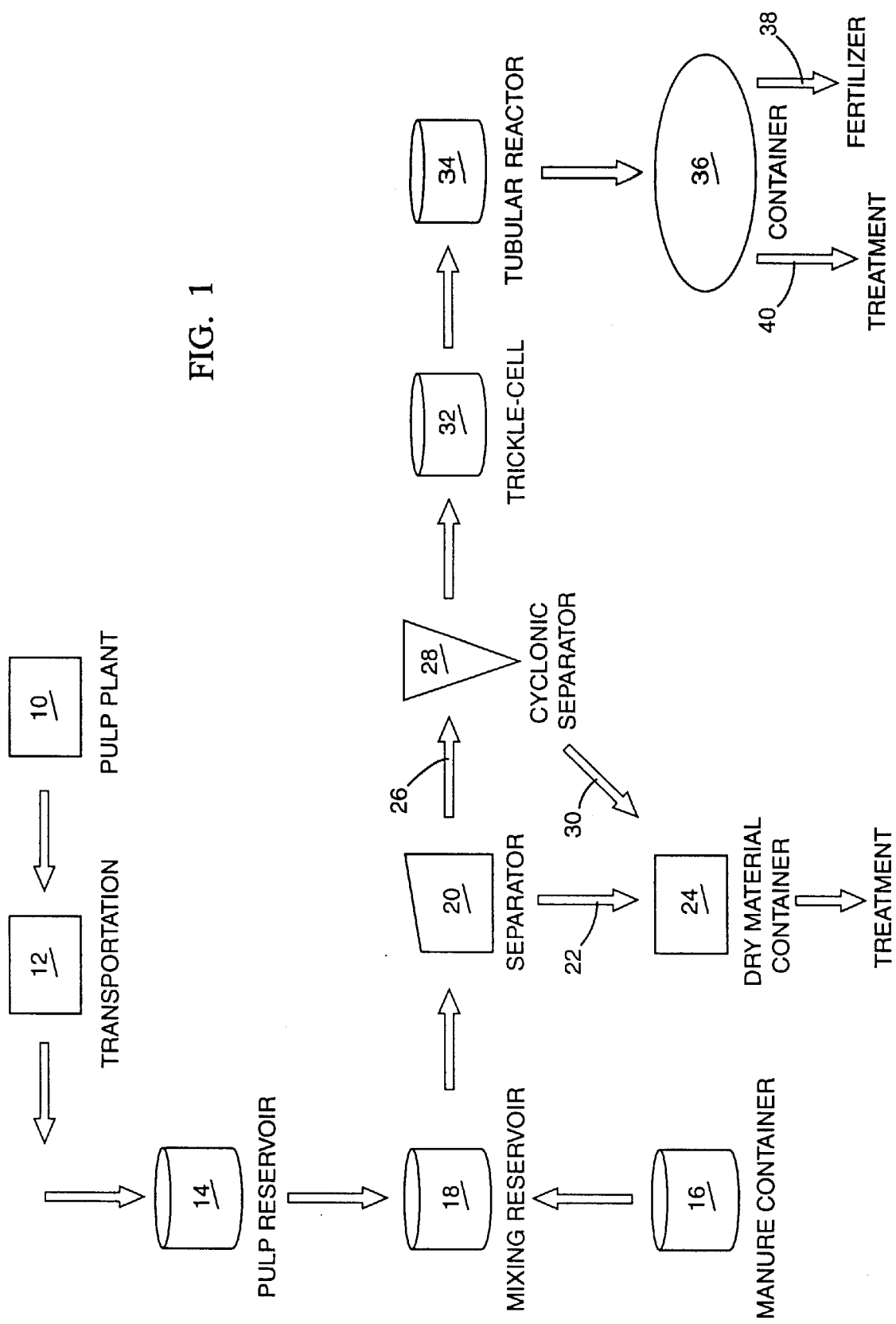
FIG. 1 is a flow diagram of the present invention.

Turning to the drawing in greater detail, there is illustrated system such as may be utilized in the practice of the present invention.

DESCRIPTION OF THE PREFERRED EMBODIMENTS

The arrangement shown is one where the cellulostic material generated at a pulp and paper facility 10 is then forwarded by a transport means 12 to a resevoir 14 located on a farm. Similarly, liquid hog manure is stored in a container 16 from whence it is transferred to a mixing resevoir 18. Cellulostic material from reservoir 14 is also transported to container 18 where they are thoroughly mixed.

Subsequently, the mixture is passed to a separator 20. A solids portion 22 is transferred to a container 24 while the liquid 26 extracted from the separator 20 is forwarded to a cyclonic separator 28.

From cyclonic separator 28, any solids 30 are transferred back to container 24 while the liquid portion is pumped or transported to a trickle cell arrangement generally designated by reference numeral 32.

From trickle cell arrangement 32, there liquid portion undergoes further treatment such as a tubular reactor 34. The liquid may then be stored in container 36. As shown in the flow diagram, a portion 38 may be utilized for fertilization or it may be transported as indicated by reference numeral 40 for further treatment.

It will be understood that the above described embodiment is for purposes of illustration only and that changes and modifications may be made thereto without departing from the spirit and scope of the invention.

I claim:

1. A method for the treatment of liquid hog manure comprising the steps of forming a mixture of liquid hog manure and a cellulostic material, passing said mixture through a screw press to provide a liquid portion and a solids portion, passing said liquid portion through a cyclonic separator to provide a second solids portion, passing said liquid portion through at least one aerobic treatment, and drying said first and second solids portion.

2. The method of claim 1 wherein the step of passing said liquid portion through at least one aerobic treatment comprises the step of passing said liquid through a plurality of trickle cell filters.

3. The method of claim 2 wherein said step of passing said liquid through a plurality of trickle cell filters comprises passing said liquid through a plurality of trickle cell filters arranged in series.

4. The method of claim 2 wherein said step of passing said liquid through a plurality of trickle cell filters comprises passing said liquid through a plurality of trickle cell filters arranged in parallel.

5. The method of claim 2 wherein each of said trickle cell filters comprises a plurality of filtration media arranged therein.

6. The method of claim 1 wherein said cellulostic material is selected from the group consisting of de-inked pulp waste material, wood shavings, and cellulostic waste from a pulp and paper process.

7. The method of claim 1 further including the step of subjecting said liquid portion to an aeration step.

* * * * *